United States Patent [19]
Florine

[11] 3,888,411
[45] June 10, 1975

[54] ENGINE INDUCTION AIR FLOW CONTROL
[75] Inventor: Robert T. Florine, Flint, Mich.
[73] Assignee: General Motors Corporation, Detroit, Mich.
[22] Filed: Sept. 3, 1974
[21] Appl. No.: 502,653

[52] U.S. Cl. .......... 236/13; 123/122 D; 123/122 H; 123/124 A; 137/111; 236/101
[51] Int. Cl. ......................................... G05d 23/08
[58] Field of Search ......... 236/13, 101 X, 93, 92 D; 123/122 D, 122 H, 124 A; 137/111

[56] References Cited
UNITED STATES PATENTS

| | | | |
|---|---|---|---|
| 3,513,817 | 5/1970 | Rgarsley | 123/122 D |
| 3,744,713 | 7/1973 | Maddocks | 236/13 |
| 3,779,223 | 12/1973 | Piech et al. | 123/122 D |
| 3,782,349 | 1/1974 | Kamo et al. | 236/101 X |

Primary Examiner—William E. Wayner
Assistant Examiner—W. E. Tapolcai, Jr.
Attorney, Agent, or Firm—C. K. Veenstra

[57] ABSTRACT

In an internal combustion engine air cleaner snorkel having an end open to ambient temperature air and an auxiliary inlet open to heated air, the induction air flow temperature is regulated by a pivoted damper assembly having a guide member positioned by a coiled bimetal and a camper member biased by a torsion spring for concomitant operation with the guide member. The damper member has a main blade portion responsive to the induction air flow rate and controlling ambient air flow and a pair of lateral blade portions controlling heated air flow but unresponsive to the induction air flow rate. Under conditions of high induction air flow the damper member moves away from the guide member against the bias of the torsion spring to permit ambient air flow through the open end and to block heated air flow through the auxiliary inlet.

3 Claims, 6 Drawing Figures

ENGINE INDUCTION AIR FLOW CONTROL

This invention relates to an engine induction air flow control and more particularly to such a control having a novel induction air flow damper assembly which is especially suitable for regulating the induction air flow temperature.

It has become common practice to regulate the temperature of internal combustion engine induction air flow by positioning a damper in the air cleaner snorkel to control air flow through the end of the snorkel open to ambient air and through an auxiliary heated air inlet. The damper usually has one portion controlling ambient air flow and another portion controlling heated air flow, the two portions being rigidly secured together. In operation, the damper has been responsive to the induction air flow rate and, at high induction air flow rates, was intended to permit only ambient air flow and to prevent heated air flow to maximize engine efficiency. However, where the damper has been positioned by a bimetal coil responsive to the induction air flow temperature, response of the damper to the rate of induction air flow has been resisted by the force of the bimetal coil. In addition, where the secondary portion of the damper has reciprocated toward and away from the heated air inlet, closure of the heated air inlet at high induction air flow rates has been resisted by air flow therethrough.

This invention provides a new induction air flow control which obviates these difficulties to more efficiently regulate the induction air flow temperature.

The induction air flow control provided by this invention achieves these objectives by a damper assembly including a guide member operated directly from the coiled bimetal and a damper member which is spring biased to operate with the guide member but which moves away from the guide member against the spring bias as the induction air flow reaches a selected rate. Further, the damper member has a main blade portion which is responsive to the rate of induction air flow and controls ambient air flow and an auxiliary blade portion which slides across the auxiliary inlet to control heated air flow without responding to the induction air flow rate.

The details as well as other features and advantages of this invention are set forth in the following description and are shown in the drawings in which.

Figure 1:
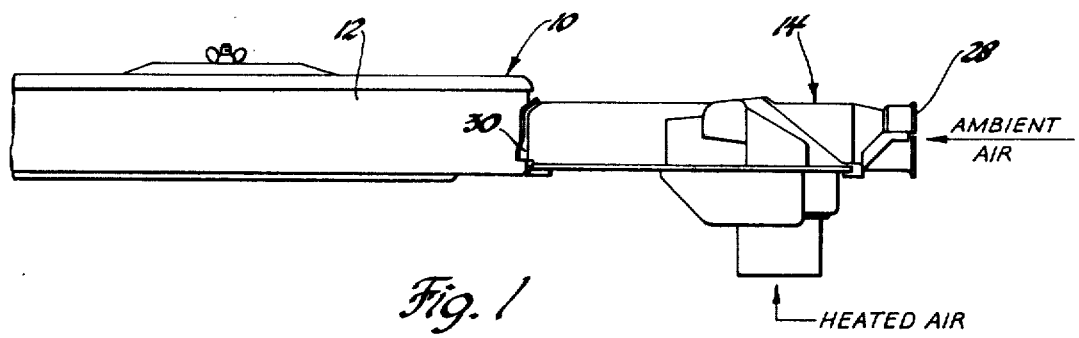
FIG. 1 is a side elevational view of an internal combustion engine air cleaner embodying this invention.

Referring first to FIG. 1, an internal combustion engine air cleaner 10 includes a main housing 12, enclosing a filter element (not shown), and a snorkel 14 through which engine induction air flow is received.

Figure 5:
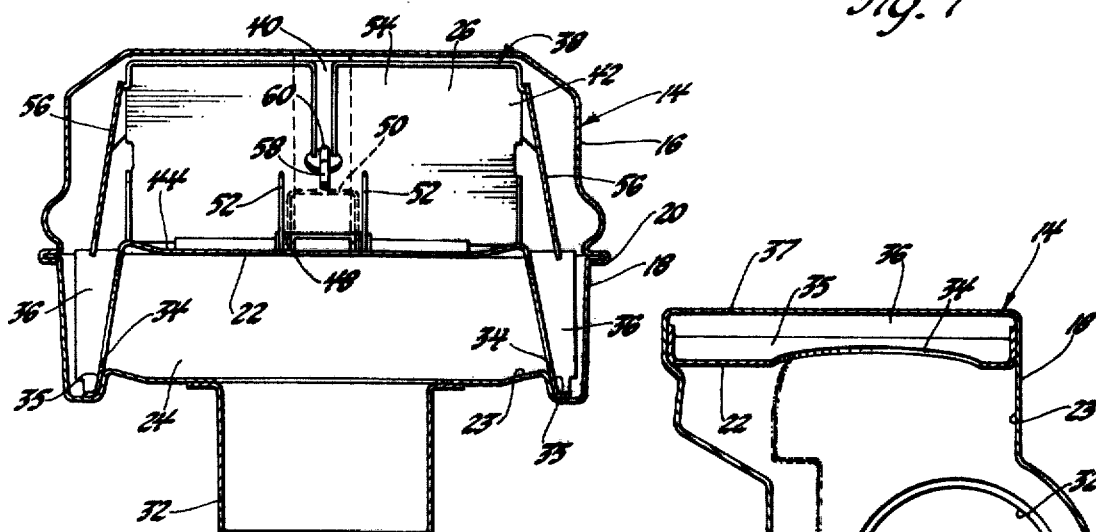
FIG. 5 is a view taken along line 5—5 of FIG. 2, further enlarged and showing details of the heated air flow path.
Figure 6:
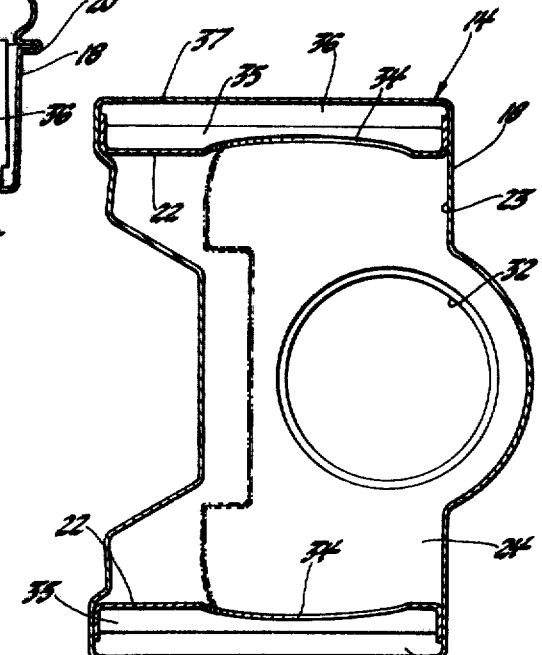
FIG. 6 is a sectional view taken along line 6—6 of FIG. 2, further enlarged and showing additional details of the heated air flow path.

As shown in FIGS. 2-5, snorkel 14 includes an upper shell member 16 and a lower shell member 18 which are crimped along the sides 20 (as particularly shown in FIG. 5). An intermediate plate 22 is received between shells 16 and 18 and overlies a recess 23 formed in lower member 18 to separate a chamber 24 from the main induction air flow conduit 26.

Induction air flow conduit 26 has an end 28 forming a primary inlet open to air at ambient temperature and an outlet 30 which discharges into main housing 12. Chamber 24 has a fitting 32 which is adapted for connection to a source of heated air such as a stove surrounding the engine exhaust manifold. Heated air flows from chamber 24 through a pair of openings 34 formed in downwardly extending flanges 35 of intermediate plate 22, into a pair of lateral channels 36 defined outwardly of flanges 35 by projections 37 formed in members 16 and 18, and then upwardly to main induction passage 26 at a location downstream of primary inlet 28. The heated air flow path defined by fitting 32, chamber 24, and openings 34 will be denominated an auxiliary or heated air inlet.

A damper assembly 38 has a narrow guide member 40 and a damper member 42 independently pivoted about a pin 44. Pin 44 is received in a pair of upstanding ears 46 formed in intermediate member 22. A torsion spring 48 (best shown in FIG. 4) has a laterally extending portion 50 overlying guide member 40 and a pair of longitudinally extending ends 52 underlying damper member 42.

Damper member 42 has a broad main blade portion 54 extending across and controlling flow through ambient air inlet 28 and a pair of auxiliary or lateral blade portions 56 which are disposed in channels 36 to slide across or traverse heated air inlet openings 34.

A control arm 58 has a curved end 60 in continuous contact with guide member 40. The opposite end of control arm 58 is welded to a coiled bimetal 62 which is secured on a shaft 64 downstream of channels 36. Shaft 64 is secured against rotational movement in the upstanding flange 66 of a mounting member 68 which also has a horizontal flange 70 secured to lower shell 18 by a pair of screws 72. Flange 66 has a plurality of shield portions 74 partially enclosing bimetal coil 62 to assure proper response of coil 62 to the temperature of the induction air flow in passage 26.

Figure 2:
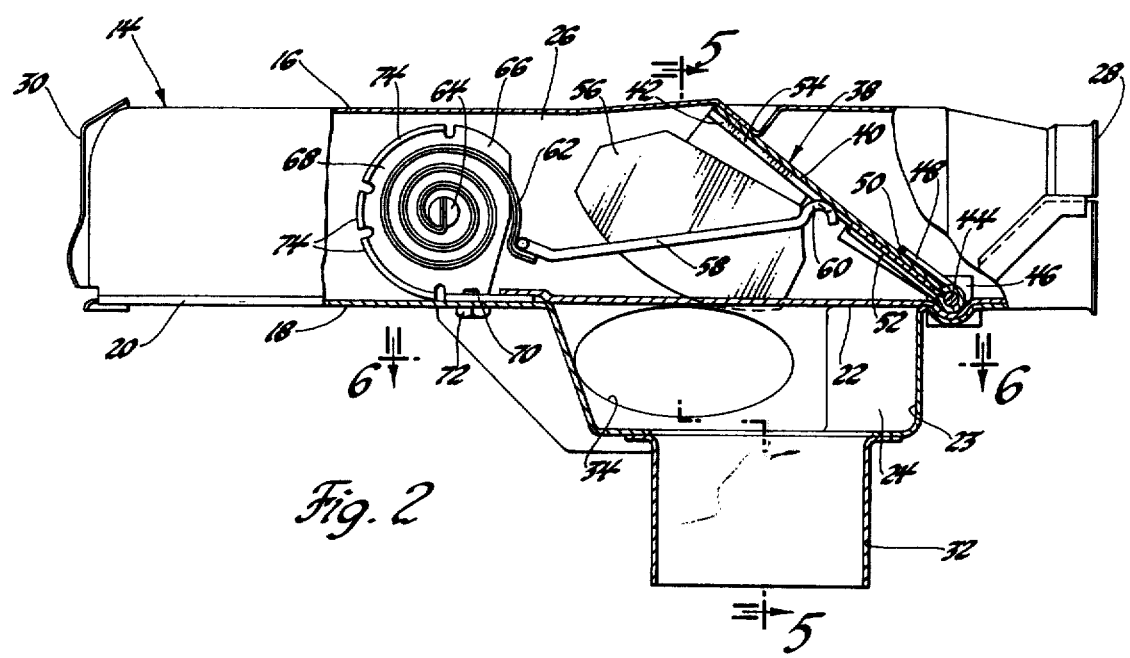
FIG. 2 is an enlarged side elevational view of the snorkel from the FIG. 1 air cleaner, parts being broken away to show the damper assembly in a low temperature, low air flow position.

In operation, damper assembly 38 intially assumes the position shown in FIG. 2, obstructing air flow through ambient air inlet 28 and permitting heated air flow through auxiliary air inlet openings 34 and channels 36 to main induction passage 26. Damper member 42 responds to induction air flow, tending to pivot counterclockwise about pin 44 and acting through torsion spring 48 to maintain guide member 40 in contact with curved end 60 of control arm 58. As the induction air flow warms to a selected temperature, coil 62 lowers arm 58, allowing guide member 40 and damper member 42 to pivot counterclockwise. As this occurs, air flow through openings 34 is partially obstructed by auxiliary blades 56 and an increasing proportion of ambient temperature air is permitted to flow through ambient air inlet 28 over main blade 54. In this manner, bimetal coil 62 moves damper member 42 between the FIG. 2 and the FIG. 3 positions to control flow through ambient air inlet 28 and heated air inlet openings 34 and thus regulate the temperature of induction air flow through passage 26. Under ordinary conditions of operation, bimetal coil 62 will position damper member 42 intermediate the FIGS. 2 and 3 positions to maintain an induction air flow temperature of, for example, 115°F.

Figure 3:
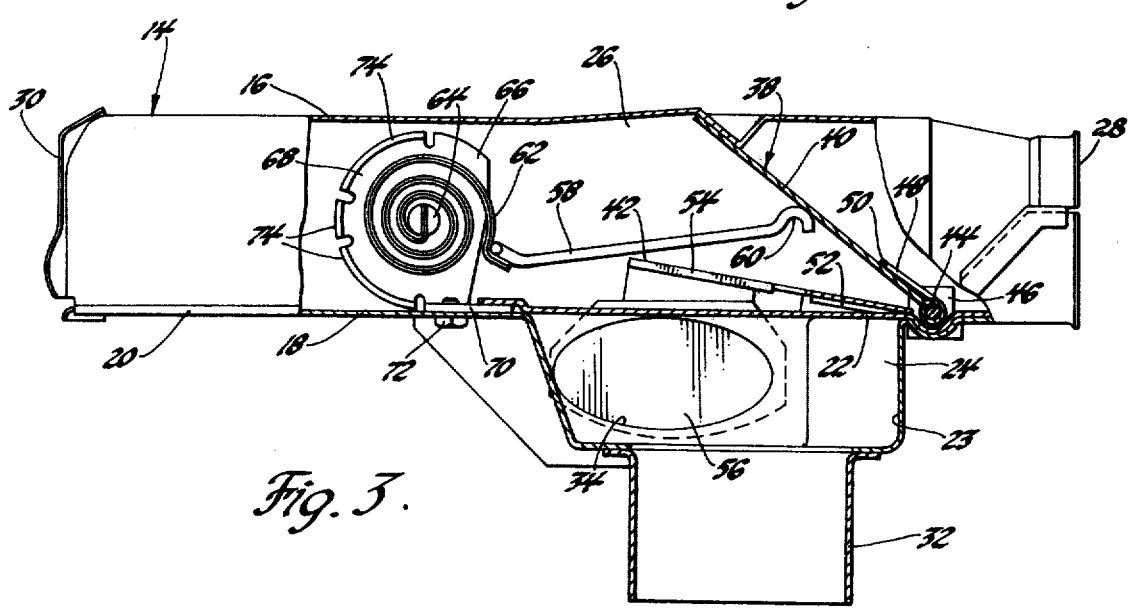
FIG. 3 is a view similar to FIG. 2 showing the damper assembly in a low temperature, high air flow position.
Figure 4:
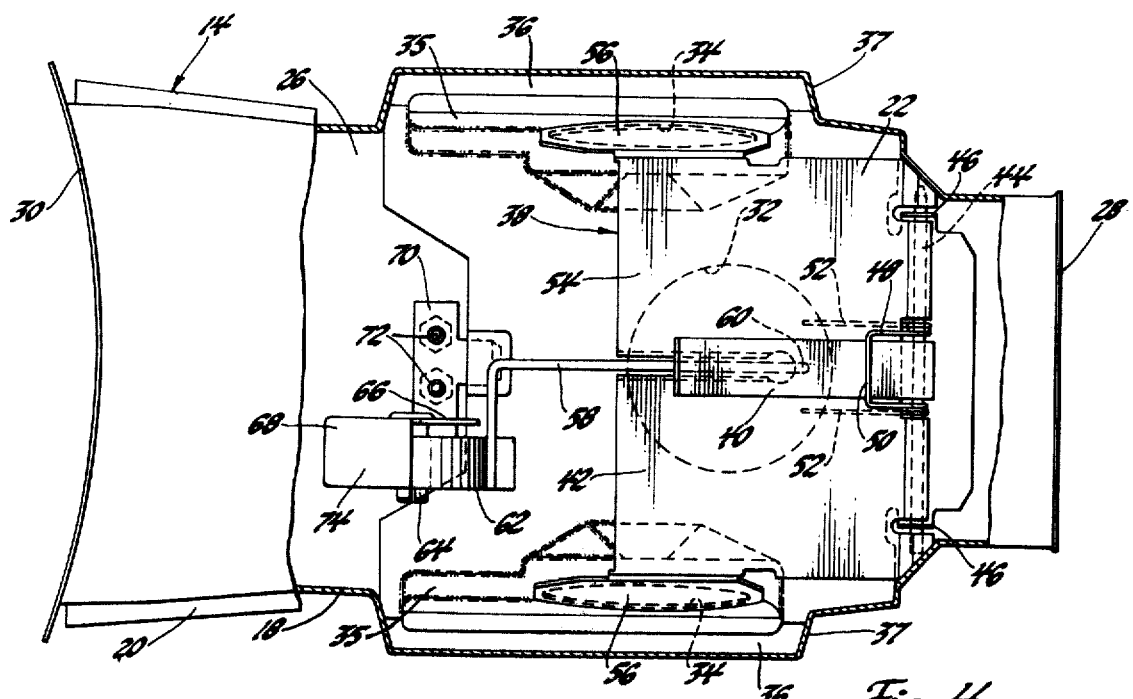
FIG. 4 is a top plan view of the FIG. 3 snorkel, parts being broken away to show further details of the damper assembly.

If bimetal coil 62 has not permitted damper member 42 to assume the position shown in FIG. 3 when the engine demands induction air flow in excess of, for example, 60 cubic feet per minute, damper member 42 is drawn away from guide member 40 against the bias of torsion spring 48 and caused to assume the position shown in FIG. 3 by the force of air flow through induction passage 26. In this position, auxiliary blades 56 obstruct air flow through heated air inlet openings 34, and main blade 54 permits unrestricted air flow through ambient air flow 28.

It will be appreciated, therefore, that damper member 42 must overcome the bias only of spring 48 and not of bimetal coil 62 when high induction air flow is demanded and accordingly is more efficient in providing the ambient temperature air required under high induction air flow conditions.

Further, it will be appreciated that auxiliary blades 56, in sliding across heated air inlet openings 34, have minimal response to air flow through openings 34 and thus are more efficient in obstructing heated air flow during high induction air flow conditions.

Finally, it will be appreciated that this engine induction air flow control may exhibit the same efficiencies of operation even though it may be assembled in other configurations. As but one example of another such configuration, the heated air inlet could open rearwardly (instead of laterally) into a channel leading upwardly to the main induction air flow passage, and the auxiliary blade portion of the damper member could depend from the rear (instead of the side) edge of the main blade portion for traversing the rearward opening.

The embodiments of the invention in which an exclusive property of privilege is claimed are defined as follows:

1. An internal combustion engine induction air flow control comprising a conduit for air flow to the engine, said conduit having a primary inlet for air at ambient temperature and an auxiliary inlet downstream of said primary inlet for heated air, an air flow damper assembly, a pivot pin mounting said damper assembly in said conduit for pivotal movement between a first position obstructing flow through said primary inlet while permitting flow through said auxiliary inlet and a second position permitting flow through said primary inlet while obstructing flow through said auxiliary inlet, said damper assembly including guide and damper members independently pivoted on said pin and spring means biasing said members for concomitant movement, temperature responsive means disposed in said conduit downstream of said inlets and having an arm connected to said guide member, said temperature responsive means biasing said damper assembly toward said first position at air flow temperatures below a selected value and permitting movement of said damper assembly to said second position at air flow temperatures above the selected value and further positioning said damper assembly intermediate said positions to maintain air flow temperature at the selected value, said damper member being movable toward said second position against the bias of said spring means independently of said guide member by air flow above a selected rate to increase the flow of ambient temperature air for maximum efficiency.

2. An internal combustion engine air cleaner comprising a snorkel defining a generally horizontal induction air conduit having an end open to air at ambient temperature and a heated air inlet opening into the bottom of said conduit downstream of said end, a pivot pin disposed in said snorkel at the bottom of said conduit between said heated air inlet and said end, a guide member pivoted on said pin and extending upwardly and downstream therefrom, a coiled bimetal disposed in said conduit downstream of said heated air inlet, a control arm connecting said bimetal to said guide member to bias said guide member upwardly about said pivot at induction air flow temperatures below a selected value and permitting lowering of said guide member about said pivot pin at induction air flow temperatures below the selected value and positioning said guide member intermediate its uppermost and lowermost positions to maintain the selected induction air flow temperature, a damper member disposed in said conduit for controlling air flow through said heated air inlet and said end, said damper member being pivoted on said pin and extending upwardly and downstream therefrom and underlying said guide member, and spring means biasing said damper member and said guide member for concomitant operation whereby said bimetal positions said damper member to obstruct ambient air flow and to permit heated air flow at induction air flow temperatures below the selected value, to permit ambient air flow and to obstruct heated air flow at induction air flow temperatures above the selected value, and to proportion ambient air flow and heated air flow to maintain the selected induction air flow temperature, and further whereby said damper member may move downwardly about said pivot pin against the bias of said spring means to permit ambient air flow and to obstruct heated air flow at induction air flow rates above a selected value.

3. An internal combustion engine induction air flow control comprising a conduit for air flow to the engine, said conduit having a primary inlet for air at ambient temperature and an auxiliary inlet downstream of said primary inlet for heated air, an air flow damper assembly disposed in said conduit for movement between a first position obstructing flow through said primary inlet while permitting flow through said auxiliary inlet and a second position permitting flow through said primary inlet while obstructing flow through said auxiliary inlet, said damper assembly including independently pivoted guide and damper members and spring means biasing said members for concomitant movement, temperature responsive means disposed in said conduit downstream of said inlets and having an arm connected to said guide member for biasing said damper assembly toward said first position at air flow temperatures below a selected value and permitting movement of said damper assembly to said second position at air flow temperatures above the selected value and further positioning said damper assembly intermediate said positions to maintain air flow temperature at the selected value, said damper member being movable toward said second position against the bias of said spring means independently of said guide member by air flow above a selected rate to increase the flow of ambient temperature air for maximum efficiency.

\* \* \* \* \*